(12) United States Patent
Farah et al.

(10) Patent No.: US 10,598,036 B2
(45) Date of Patent: Mar. 24, 2020

(54) ASSEMBLY FOR SEALING A GAP BETWEEN COMPONENTS OF A TURBINE ENGINE

(71) Applicant: United Technologies Corporation, Hartford, CT (US)

(72) Inventors: Jorge I. Farah, Hartford, CT (US); Andrew D. Burdick, Somers, CT (US)

(73) Assignee: United Technologies Corporation, Farmington, CT (US)

(*) Notice: Subject to any disclaimer, the term of this patent is extended or adjusted under 35 U.S.C. 154(b) by 370 days.

(21) Appl. No.: 14/774,025

(22) PCT Filed: Mar. 12, 2014

(86) PCT No.: PCT/US2014/024676
§ 371 (c)(1),
(2) Date: Sep. 9, 2015

(87) PCT Pub. No.: WO2014/165182
PCT Pub. Date: Oct. 9, 2014

(65) Prior Publication Data
US 2016/0024952 A1    Jan. 28, 2016

Related U.S. Application Data

(60) Provisional application No. 61/779,672, filed on Mar. 13, 2013.

(51) Int. Cl.
| F01D 11/00 | (2006.01) |
| F01D 25/24 | (2006.01) |
| F02C 7/28 | (2006.01) |
| F01D 9/02 | (2006.01) |

(52) U.S. Cl.
CPC .............. *F01D 11/005* (2013.01); *F01D 9/02* (2013.01); *F01D 25/24* (2013.01); *F01D 25/246* (2013.01); *F02C 7/28* (2013.01); *F05D 2240/12* (2013.01); *F05D 2240/58* (2013.01)

(58) Field of Classification Search
CPC .......... F01D 11/005; F01D 11/08; F01D 9/02; F01D 9/023; F01D 9/041; F01D 25/24; F01D 25/246; F02C 7/28
USPC ........................... 415/208.1, 173.1; 277/603
See application file for complete search history.

(56) References Cited

U.S. PATENT DOCUMENTS

| 7,238,003 B2* | 7/2007 | Synnott ................. F01D 11/003 29/889.22 |
| 2004/0120814 A1 | 6/2004 | Brainch et al. |
| 2005/0057003 A1 | 3/2005 | Iguchi et al. |
| 2005/0244267 A1* | 11/2005 | Coign ..................... F01D 9/023 415/189 |

(Continued)

*Primary Examiner* — Laert Dounis
*Assistant Examiner* — Kelsey L Stanek
(74) *Attorney, Agent, or Firm* — Getz Balich LLC

(57) ABSTRACT

An assembly for a turbine engine includes a case, a guide vane arrangement and a flexible seal ring. The case extends circumferentially around an axis, and includes a first seal land. The guide vane arrangement is located radially within the case, and includes a second seal land. The seal ring at least partially seals a gap between the first seal land and the second seal land. The seal ring includes a first leg and a second leg that is connected to the first leg at a corner of the seal ring. The first leg is axially engaged with the first seal land. The second leg is axially engaged with the second seal land.

20 Claims, 8 Drawing Sheets

(56) References Cited

U.S. PATENT DOCUMENTS

| | | | | |
|---|---|---|---|---|
| 2009/0129917 A1* | 5/2009 | Hazevis | ............... | F01D 11/005 |
| | | | | 415/173.1 |
| 2011/0049812 A1* | 3/2011 | Sutcu | ..................... | F01D 9/023 |
| | | | | 277/603 |
| 2011/0179798 A1* | 7/2011 | Pieussergues | .......... | F01D 9/023 |
| | | | | 60/752 |

* cited by examiner

ASSEMBLY FOR SEALING A GAP BETWEEN COMPONENTS OF A TURBINE ENGINE

This application claims priority to PCT Patent Appln. No. PCT/US2014/024676 filed Mar. 12, 2014, which claims priority to U.S. Patent Appln. No. 61/779,672 flied Mar. 13, 2013, which are is-hereby incorporated herein by reference in their entireties.

BACKGROUND OF THE INVENTION

1. Technical Field

This disclosure relates generally to a turbine engine and, more particularly, to an assembly for sealing a gap between components of a turbine engine.

2. Background Information

A turbine engine may include a plurality of piston seals for sealing gaps between a turbine engine case and an outer platform of a guide vane arrangement. Each piston seal may contact and extend between a surface of the case and a surface of the platform, where the case surface is typically perpendicular of the platform surface. During turbine engine operation, the platform surface may move relative to the case surface as a result of, for example, disproportional thermal growth between the case and the platform. Such movement may cause a misalignment between the case and platform surfaces, which may allow gas to leak between the piston seal and the case and/or platform surfaces.

There is a need in the art for an improved seal for a turbine engine.

SUMMARY OF THE DISCLOSURE

According to an aspect of the invention, an assembly for a turbine engine is provided that includes a case, a guide vane arrangement and a flexible seal ring. The case extends circumferentially around an axis, and includes a first seal land. The guide vane arrangement is located radially within the case, and includes a second seal land. The seal ring at least partially seals a gap between the first seal land and the second seal land. The seal ring includes a first leg and a second leg, which is connected to the first leg at a corner of the seal ring. The first leg is axially engaged with the first seal land. The second leg is axially engaged with the second seal land.

According to another aspect of the invention, another assembly for a turbine engine is provided that includes a case, a guide vane arrangement and a flexible seal ring. The case extends circumferentially around an axis, and includes an annular first surface. The guide vane arrangement extends circumferentially around the axis, and includes an annular second surface. The seal ring is engaged axially between the first surface and the second surface, and at least partially seals a gap between the first surface and the second surface. The seal ring extends circumferentially around the axis, and is configured with a generally v-shaped cross-sectional geometry.

According to still another aspect of the invention, another assembly for a turbine engine is provided that includes a case, a guide vane arrangement and a flexible seal ring. The case extends circumferentially around an axis, and includes a first seal land. The guide vane arrangement is located radially within the case, and includes a second seal land. The seal ring at least partially seals a gap between the first seal land and the second seal land. The seal ring includes a first leg and a second leg that is connected to the first leg. A longitudinal chord of the first leg is angularly offset from a longitudinal chord of the second leg by between approximately ten degrees and approximately thirty degrees. The first leg is axially engaged with the first seal land. The second leg is axially engaged with the second seal land.

The first leg may be connected to the second leg at a corner of the seal ring.

The seal ring may include a first leg and a second leg that is connected to the first leg at a corner. The first leg may be axially engaged with the first surface. The second leg may be axially engaged with the second surface.

The case may include a tubular body and a seal land that is located radially within and bonded to the tubular body. The seal land may include the first surface. In addition or alternatively, the guide vane arrangement may include an outer platform and a seal land that circumscribes and is bonded to the outer platform. The seal land may include the second surface.

The seal ring may be configured with a generally v-shaped cross-sectional geometry. Alternatively, the seal ring may be configured with various cross-sectional geometries other than a v-shaped cross-sectional geometry.

The first leg and the second leg may extend radially inwards from the corner of the seal ring.

The corner of the seal ring may radially engage an inner surface of the case. The case may include an axially extending tab that defines the inner surface.

A longitudinal chord of the first leg may be angularly offset from a longitudinal chord of the second leg by between approximately ten degrees and approximately thirty degrees.

The first leg may include a first portion and a second portion. The first portion may extend radially from the corner of the seal ring to the second portion. In addition or alternatively, the first portion may have a substantially straight cross-sectional geometry. The second portion may axially engage the first seal land. In addition or alternatively, the second portion may have an arcuate cross-sectional geometry.

The second leg may include a first portion and a second portion. The first portion may extend radially from the corner of the seal ring to the second portion. In addition or alternatively, the first portion may have a substantially straight cross-sectional geometry. The second portion may axially engage the second seal land. In addition or alternatively, the second portion may have an arcuate cross-sectional geometry.

The second seal land may move axially and/or radially relative to the first seal land. In addition or alternatively, the seal ring may slide radially against the second seal land.

The first seal land may include an annular first surface, and the first leg may axially engage the first surface. The second seal land may include an annular second surface, and the second leg may axially engage the second surface.

The case may include a tubular body. The first seal land may be located radially within and/or bonded to the tubular body.

The guide vane arrangement may include an inner platform, an outer platform and a plurality of stator vanes. The stator vanes may extend radially between the inner platform and the outer platform. The second seal land may circumscribe and/or be bonded to the outer platform.

The case may be configured as or otherwise includes a first case. The assembly may include a second case and a blade outer air seal. The blade outer air seal may be located radially within and/or fastened to the second case. The first seal land may include a passage that directs air from a first plenum to a second plenum. The first plenum may extend radially between the first case and the guide vane arrangement. The second plenum may extend radially between the second case and the blade outer air seal.

The foregoing features and the operation of the invention will become more apparent in light of the following description and the accompanying drawings.

DETAILED DESCRIPTION OF THE INVENTION

Figure 1:
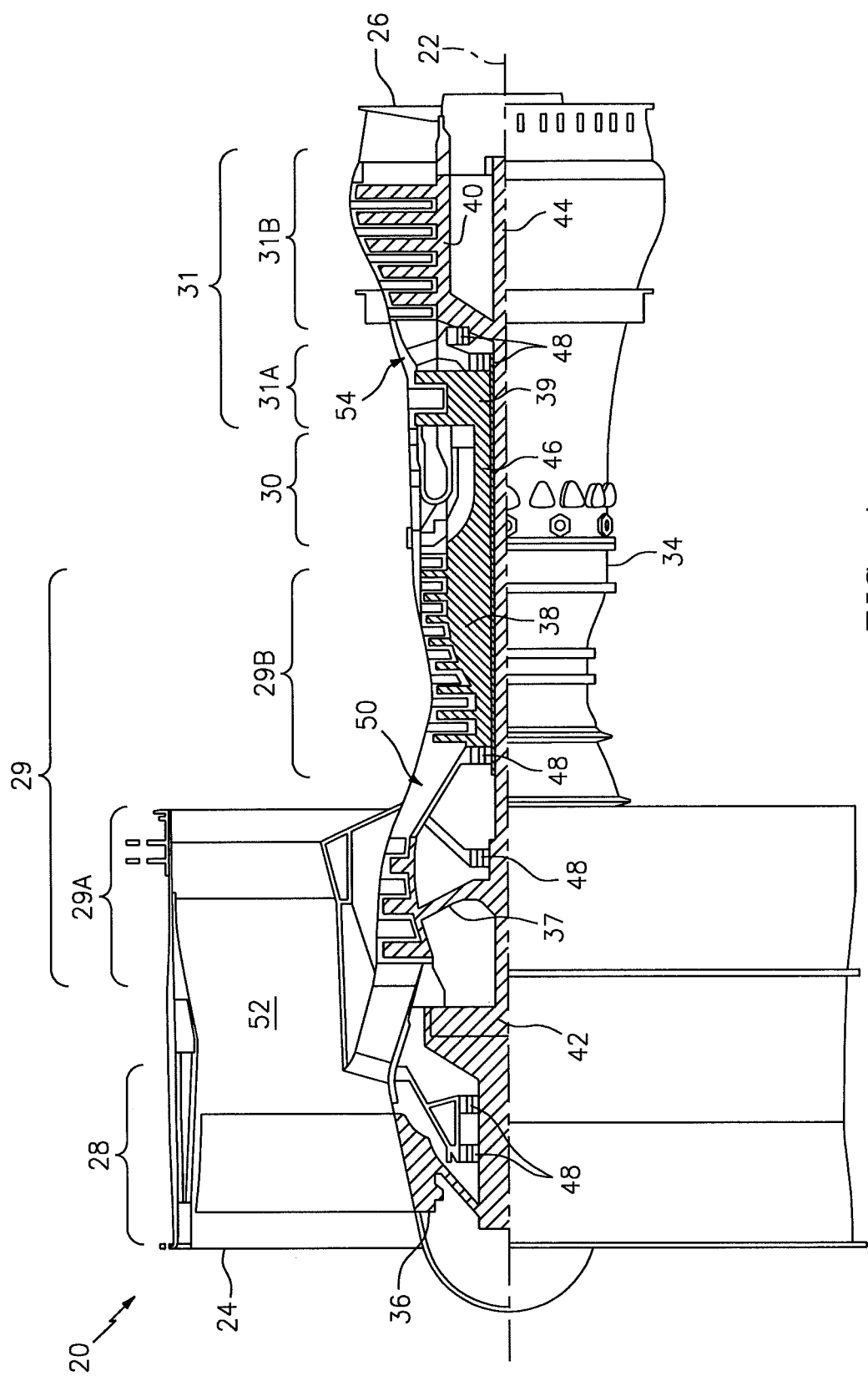
FIG. 1 is a side cutaway illustration of a geared turbine engine.

FIG. 1 is a side cutaway illustration of a geared turbine engine 20 that extends along an axis 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the axis 22 within an engine housing 34.

Each of the engine sections 28, 29A, 29B, 31A and 31B includes a respective rotor 36-40. Each of the rotors 36-40 includes a plurality of rotor blades arranged circumferentially around and connected to (e.g., formed integral with or mechanically fastened, welded, brazed, adhered or otherwise bonded to) one or more respective rotor disks. The fan rotor 36 is connected to a gear train 42; e.g., an epicyclic gear train. The gear train 42 and the LPC rotor 37 are connected to and driven by the LPT rotor 40 through a low speed shaft 44. The HPC rotor 38 is connected to and driven by the HPT rotor 39 through a high speed shaft 46. The low and the high speed shafts 44 and 46 are rotatably supported by a plurality of bearings 48. Each of the bearings 48 is connected to the engine housing 34 by at least one stator such as, for example, an annular support strut.

Air enters the engine 20 through the airflow inlet 24, and is directed through the fan section 28 and into an annular core gas path 50 and an annular bypass gas path 52. The air within the core gas path 50 may be referred to as "core air". The air within the bypass gas path 52 may be referred to as "bypass air". The core air is directed through the engine sections 29-31 and exits the engine 20 through the airflow exhaust 26. Within the combustor section 30, fuel is injected into and mixed with the core air and ignited to provide forward engine thrust. The bypass air is directed through the bypass gas path 52 and out of the engine 20 to provide additional forward engine thrust, or reverse thrust via a thrust reverser.

Figure 2:
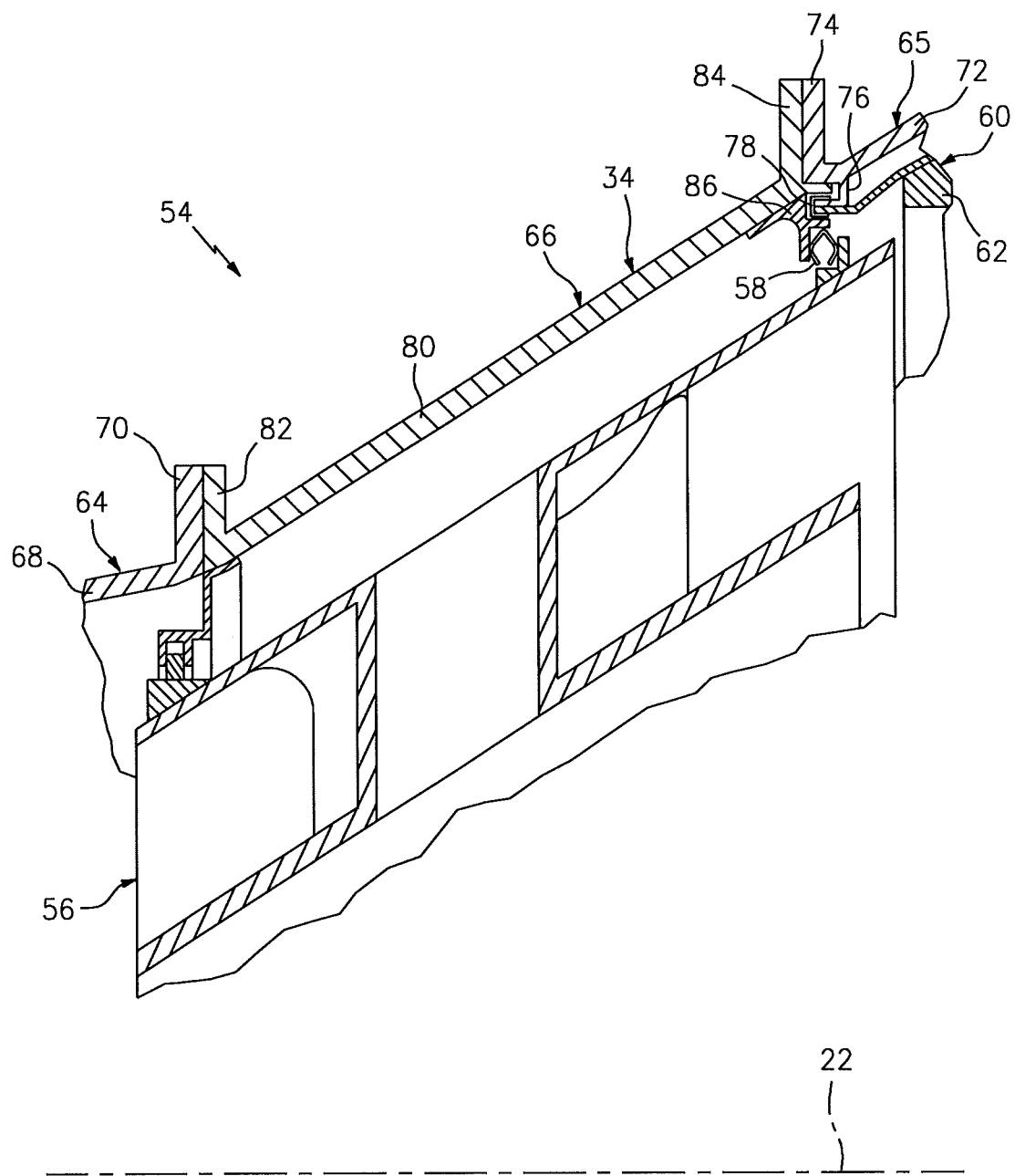
FIG. 2 is a side sectional illustration of a portion of an assembly for the turbine engine of FIG. 1.

FIG. 2 is a side sectional illustration of a portion of an assembly 54 for the engine 20 of FIG. 1. The assembly 54 includes at least a portion of the engine housing 34, a stator guide vane arrangement 56 and a flexible seal ring 58. The assembly 54 may also include a blade outer air seal 60 (BOAS) with an abradable seal element 62.

The engine housing 34 includes an upstream case 64, a downstream case 65 and an intermediate case 66. The upstream case 64 may be configured to house at least a portion of the HPT rotor 39 of FIG. 1. The upstream case 64 extends circumferentially around the axis 22. The upstream case 64 includes a tubular body 68 and a flange 70 (e.g., an annular flange). The body 68 extends along the axis 22 to a body downstream end. The flange 70 extends radially out from the body 68 at (e.g., on, adjacent or proximate) the downstream end.

The downstream case 65 may be configured to house at least a portion of the LPT rotor 40 of FIG. 1. The downstream case 65 extends circumferentially around the axis 22. The downstream case 65 includes a tubular body 72 and a flange 74 (e.g., an annular flange). The body 72 extends along the axis 22 to a body upstream end. The flange 74 extends radially out from the body 72 at the upstream end. The downstream case 65 may also include a mounting flange 76 (e.g., an annular flange), to which the blade outer air seal 60 may be fastened, for example, with one or more clips 78 (e.g., c-clips).

The intermediate case 66 is configured to house at least a portion of the guide vane arrangement 56. The intermediate case 66 extends circumferentially around the axis 22. The intermediate case 66 includes a tubular body 80, an upstream flange 82 (e.g., an annular flange), and a downstream flange 84 (e.g., an annular flange). The body 80 extends along the axis 22 between a body upstream end and a body downstream end. The upstream flange 82 extends radially out from the body 80 at the upstream end. The upstream flange 82 may be fastened to the flange 70 with one or more fasteners (not shown), which attaches the intermediate case 66 to the upstream case 64. The downstream flange 84 extends radially out from the body 80 at the downstream end. The downstream flange 84 may be fastened to the flange 74 with one or more fasteners (see FIG. 3), which attaches the intermediate case 66 to the downstream case 65.

The intermediate case 66 also includes an annular upstream seal land 86 located radially within the body 80 at the downstream end. The upstream seal land 86 may be bonded (e.g., welded, brazed and/or adhered) to the body 80. Alternatively, the upstream seal land 86 may be mechanically fastened (e.g., press fit, bolted, riveted, etc.) to the body 80. Still alternatively, the upstream seal land 86 may be formed integral with the body 80. For example, the body 80, the upstream flange 82, the downstream flange 84 and the upstream seal land 86 may be cast, milled, machined and/or otherwise formed as a unitary body.

Figure 3:
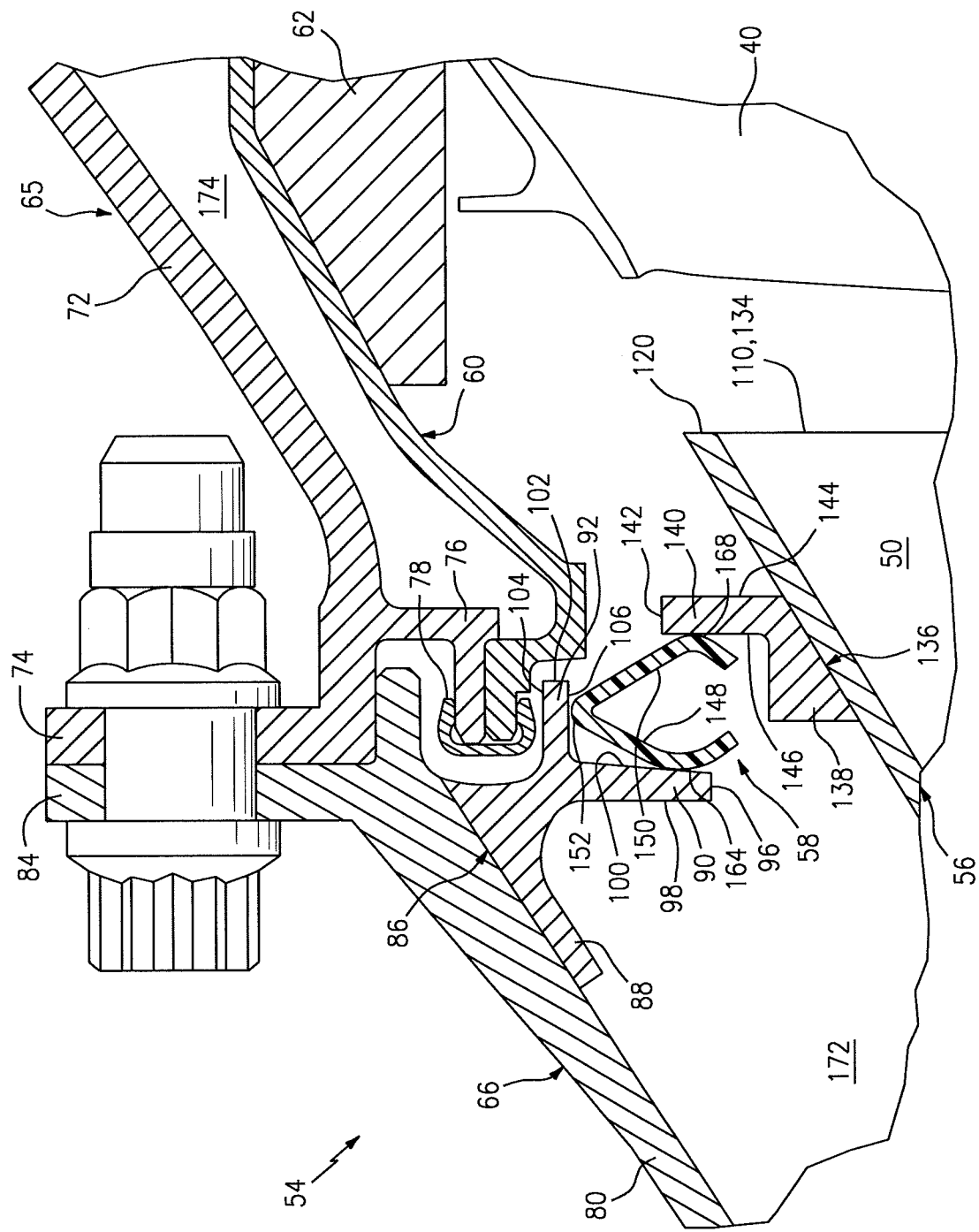
FIG. 3 is an enlarged side sectional illustration of a portion of the assembly of FIG. 2 at a first circumferential location.
Figure 4:
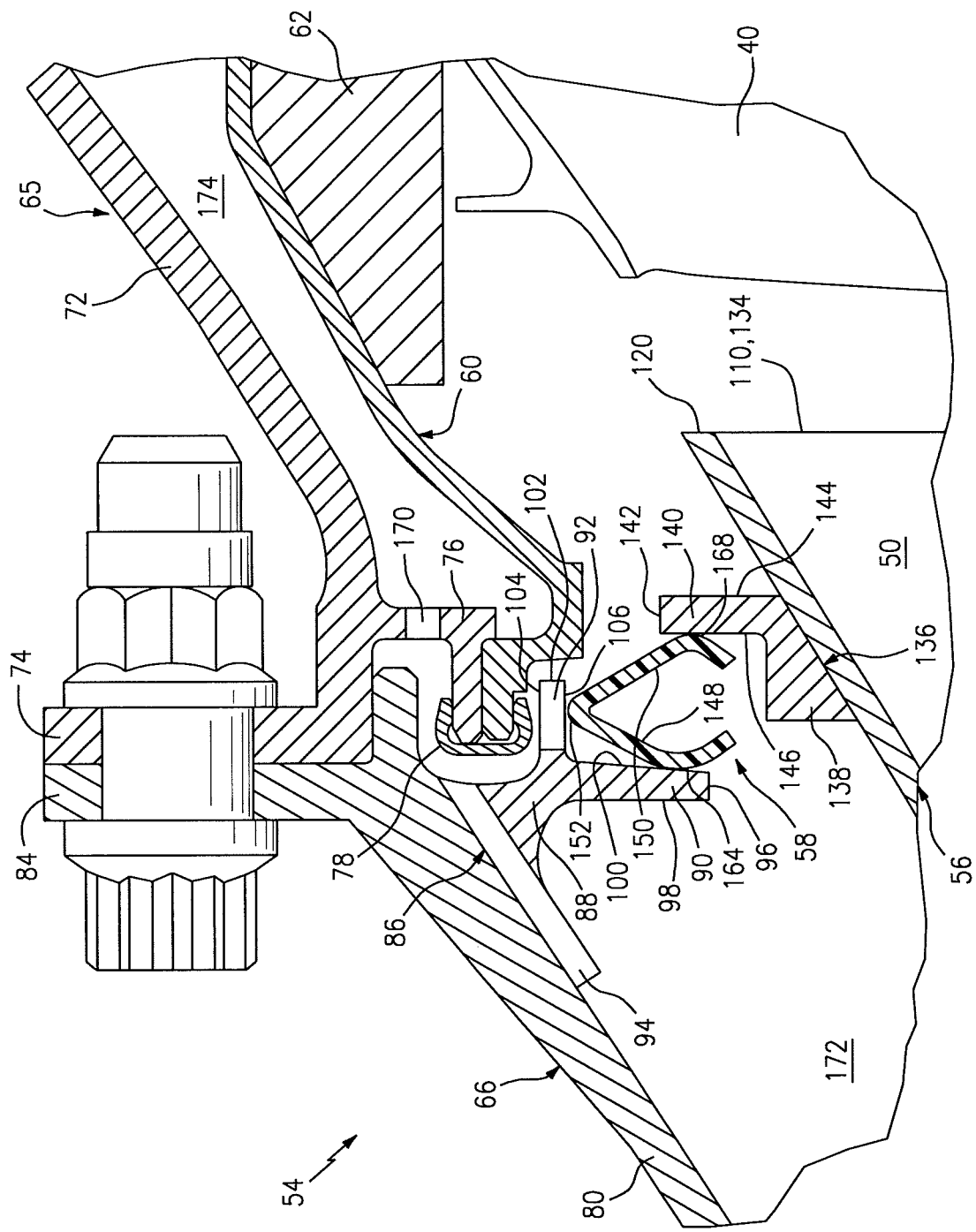
FIG. 4 is an enlarged side sectional illustration of a portion of the assembly of FIG. 2 at a second circumferential location.

Referring to FIGS. 3 and 4, the upstream seal land 86 includes a base 88, a flange 90 (e.g., an annular flange), and one or more locating tabs 92. The base 88 extends circumferentially around the axis 22, and is connected to the body 80. The base 88 includes one or more cooling passages 94 (e.g., channels, through-holes, etc.) that are arranged circumferentially around the axis 22. One or more of the cooling passages 94 each extends axially through the base 88 and the upstream seal land 86. The flange 90 extends circumferentially around the axis 22. The flange 90 extends radially inward from the base 88 to an inner flange end 96. The flange 90 extends axially between a flange upstream surface 98 and a flange downstream surface 100 (e.g., an annular surface), which extends radially from the tabs 92 to the flange end 96. The tabs 92 are arranged circumferentially around the axis 22. One or more of the tabs 92 each extends axially from the base 88 to a downstream tab end 102. One or more of the tabs 92 each extends radially between a tab outer surface 104 and a tab inner surface 106, which extends axially from the downstream surface 100 to the tab end 102.

Figure 5:
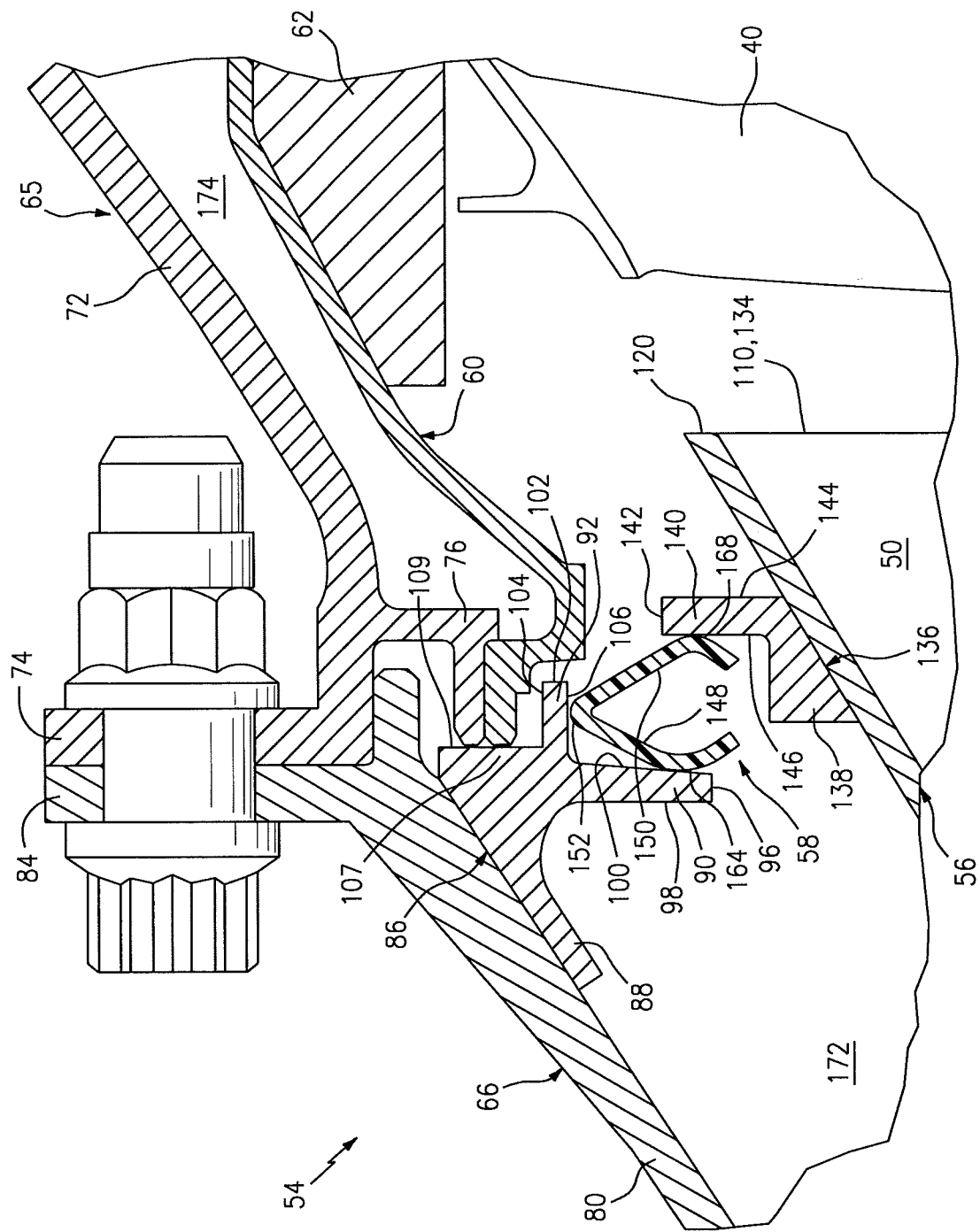
FIG. 5 is an enlarged side sectional illustration of a portion of the assembly of FIG. 2 at a third circumferential location.

Referring to FIG. 5, the upstream seal land 86 may also include one or more locating protrusions 107. The protrusions 107 are arranged circumferentially around the axis 22. The protrusions 107 extend axially out from the base 88 to respective locating surfaces 109. The locating surfaces 109 may axially engage the blade outer air seal 60 and/or the mounting flange 76, and may locate the blade outer air seal 60 within the engine 20.

Referring to FIGS. 1 and 2, the guide vane arrangement 56 is located radially within the intermediate case 66. The guide vane arrangement 56 may be configured to guide the flow of core gas between the HPT rotor 39 and the LPT rotor 40. Alternatively, the guide vane arrangement 56 may be configured to guide the flow of gas between or within any of the engine sections 28, 29A, 29B, 31A and 31B.

Figure 6:
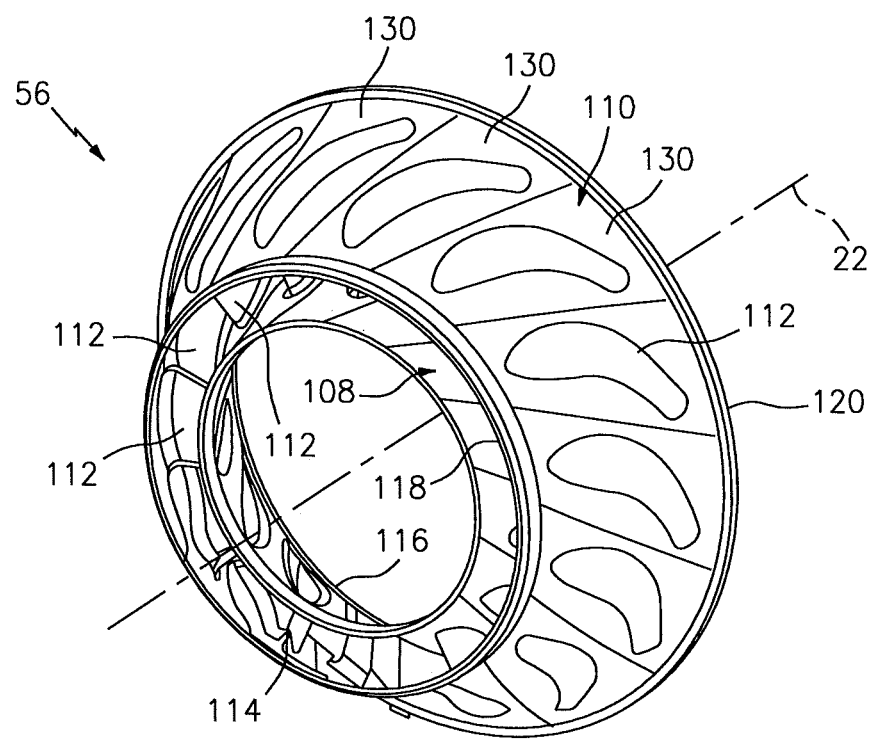
FIG. 6 is a perspective illustration of a stator guide vane arrangement for the assembly of FIG. 2.
Figure 7:
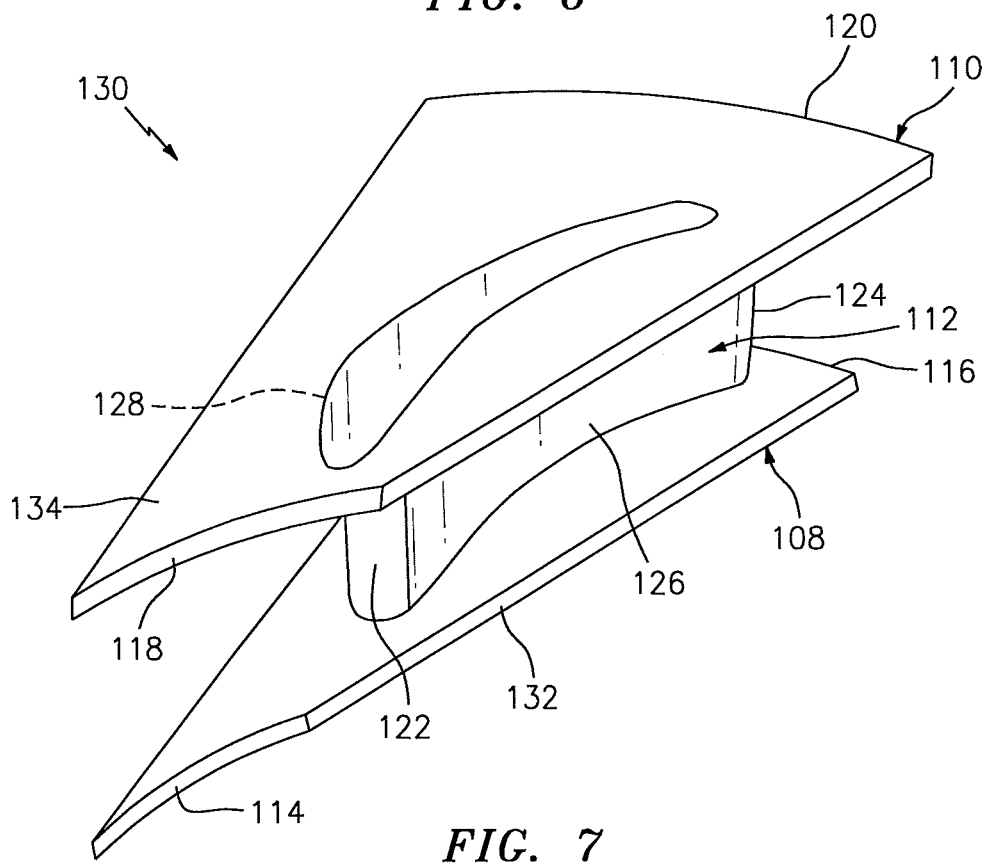
FIG. 7 is a perspective illustration of a segment of the guide vane arrangement of FIG. 6.

Referring to FIG. 6, the guide vane arrangement 56 includes a vane arrangement inner platform 108, a vane arrangement outer platform 110, and one or more stator guide vanes 112 (e.g., hollow guide vanes). The inner platform 108 and the outer platform 110 each extends circumferentially around the axis 22. The inner platform 108 extends axially between an inner platform upstream end 114 and an inner platform downstream end 116 (see FIG. 7). The outer platform 110 extends axially between an outer platform upstream end 118 and an outer platform downstream end 120. The guide vanes 112 are arranged circumferentially around the axis 22. The guide vanes 112 extend radially between and are connected to the inner platform 108 and the outer platform 110. Referring to FIG. 7, one or more of the guide vanes 112 each extends axially between an upstream leading edge 122 and a downstream training edge 124. One or more of the guide vanes 112 each extends laterally (e.g., circumferentially or tangentially) between a concave surface 126 and a convex surface 128.

Referring to FIG. 6, the guide vane arrangement 56 may be configured from a plurality of vane arrangement segments 130. Referring to FIG. 7, one or more of the vane arrangement segments 130 each includes a (e.g., circumferential) segment 132 of the inner platform 108, a (e.g., circumferential) segment 134 of the outer platform 110, and at least one of the guide vanes 112. One or more of the vane arrangement segments 130 may each be configured as a unitary body. The guide vane 112, for example, may be cast, machined, milled and/or otherwise formed integral with the inner platform segment 132 and the outer platform segment 134. Alternatively, the inner platform 108 and/or the outer platform 110 may each be configured as a full hoop body.

Referring to FIG. 3, the guide vane arrangement 56 also includes an annular downstream seal land 136 that circumscribes the outer platform 110 at the outer platform downstream end 120. The downstream seal land 136 may be bonded to the outer platform 110. Alternatively, the downstream seal land 136 may include a plurality of (e.g., circumferential) segments, each of which is formed integral with a respective one of the outer platform segments 134.

The downstream seal land 136 includes a base 138 and a flange 140 (e.g., an annular flange). The base 138 extends circumferentially around the axis 22, and is connected to the outer platform 110. The flange 140 extends radially outward from the base 138 to an outer flange end 142. The flange 140 extends axially between a flange downstream surface 144 and a flange upstream surface 146 (e.g., an annular surface), which extends radially from the base 138 to the flange end 142.

Figure 8:
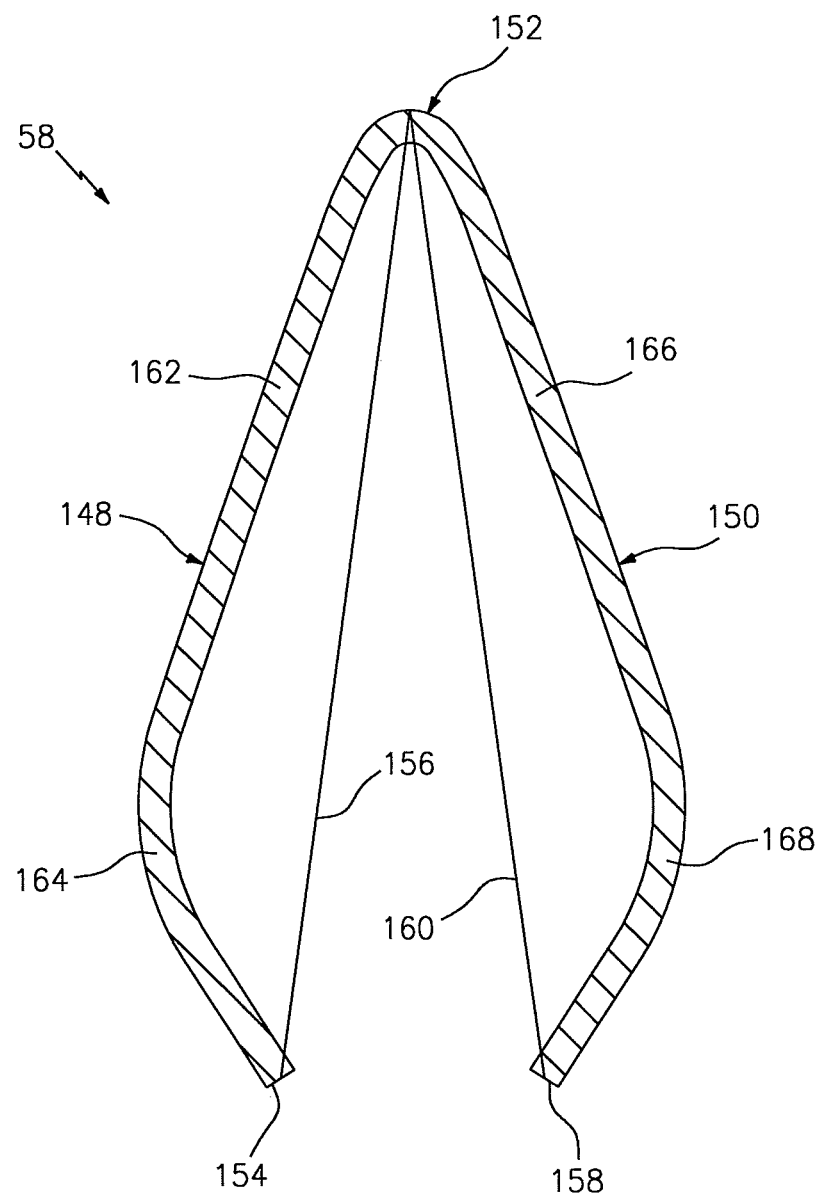
FIG. 8 is a side sectional illustration of a portion of a flexible seal ring for the assembly of FIG. 2.

The seal ring 58 extends circumferentially around the axis 22. Referring to FIG. 8, the seal ring 58 may be configured with a generally v-shaped cross-sectional geometry. The seal ring 58, for example, includes an upstream leg 148 and a downstream leg 150 that is connected to and intersects the upstream leg 148 at a corner 152 of the seal ring 58. The upstream leg 148 extends radially inwards from the corner 152 to an upstream leg inner end 154, and has a longitudinal chord 156 that extends from the corner 152 to the inner end 154. The downstream leg 150 extends radially inwards from the corner 152 to a downstream leg inner end 158, and has a longitudinal chord 160 that extends from the corner 152 to the inner end 158. The longitudinal chord 160 may be angularly offset from the longitudinal chord 156 by, for example, between about ten degrees (10°) and about thirty degrees (30°). The present invention, however, is not limited to any particular angular offset between the chords 156 and 160.

The upstream leg 148 includes an upstream leg outer portion 162 and an upstream leg inner portion 164. The outer portion 162 extends radially from the corner 152 and the downstream leg 150 to the inner portion 164. The outer portion 162 may have a substantially straight cross-sectional geometry. The inner portion 164 extends radially from the outer portion 162 to the inner end 154. The inner portion 164 may have an arcuate cross-sectional geometry.

The downstream leg 150 includes a downstream leg outer portion 166 and a downstream leg inner portion 168. The outer portion 166 extends radially from the corner 152 and the upstream leg 148 to the inner portion 168. The outer portion 166 may have a substantially straight cross-sectional geometry. The inner portion 168 extends radially from the outer portion 166 to the inner end 158. The inner portion 168 may have an arcuate cross-sectional geometry.

Referring to FIG. 4, the seal ring 58 is engaged axially between the upstream seal land 86 and the downstream seal land 136. The seal ring 58 at least partially seals a gap between the upstream seal land 86 and the downstream seal land 136. The upstream leg inner portion 164, for example, axially and sealingly engages (e.g., contacts) the flange downstream surface 100. The downstream leg inner portion 168 axially and sealingly engages the flange upstream surface 146. The corner 152 of the seal ring 58 radially engages the inner surface 106 of one or more of the tabs 92, which radially locates the seal ring 58 relative to the seal lands 86 and 136. The base 88 may be located next to the clips 78, and may prevent one or more of the clips 78 from slipping off of the mounting flange 76 and the blade outer air seal 60 during turbine engine 20 operation.

The cooling passages 94 are fluidly coupled with one or more cooling passages 170 (e.g., through-holes, channels, etc.) in the mounting flange 76. In this manner, the cooling passages 94 and 170 may direct cooling air (e.g., compressor bleed air) from a first plenum 172 to a second plenum 174 during turbine engine 20 operation. The first plenum 172 extends radially between the intermediate case 66 and the outer platform 110. The second plenum 174 extends radially between the downstream case 65 and the blade outer air seal 60.

The downstream seal land 136 may be subject to relatively high temperatures, whereas the upstream seal land 86 and/or the seal ring 58 may be subject to relatively low temperatures. This temperature differential may cause disproportional thermal growth between the downstream seal land 136, the upstream seal land 86 and/or the seal ring 58. This disproportional thermal growth may cause the downstream seal land 136 to move axially, radially and/or pivot relative to the upstream seal land 86. The disproportional thermal growth may also cause the downstream seal land 136 may move radially relative to the seal ring 58. The cooling air within the first plenum 172, however, may force the seal ring legs 148 and 150 against the seal lands 86 and 136 where, for example, the pressure of the cooling air within the first plenum 172 is greater than the pressure of the core air the core gas path 50. In this manner, the seal ring 58 may remain (e.g., sealingly) engaged with each of the seal lands 86 and 136 as the seal lands move relative to one another and/or as the downstream leg 150 slides radially against the flange upstream surface 146.

Figure 9:
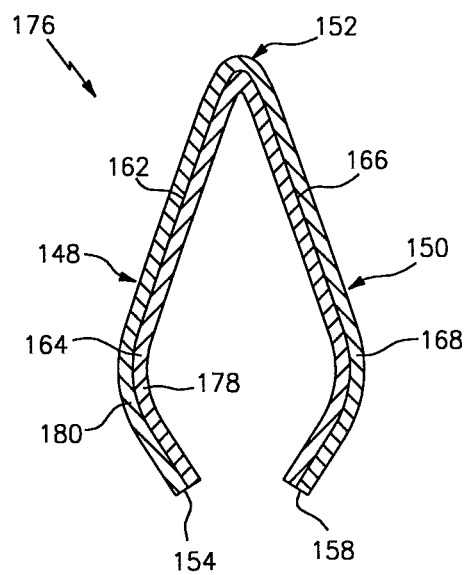
FIG. 9 is a side sectional illustration of a portion of an alternate embodiment flexible seal ring for the assembly of FIG. 2.

FIG. 9 is a side sectional illustration of a portion of an alternate embodiment flexible seal ring 176. In contrast to the seal ring 58 of FIG. 4, the seal ring 176 is configured with more than one ply of material. The seal ring 176, for example, is formed from plies 178 and 180. Such a multi-ply configuration may increase the stiffness of the seal ring 176 and/or increase the force applied by the seal ring 176 against the seal lands.

Figure 10:
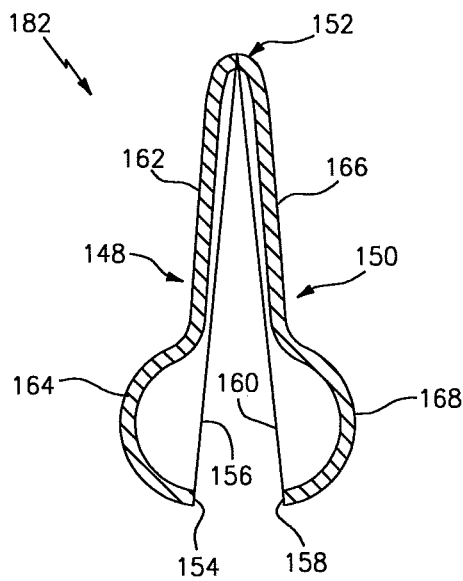
FIG. 10 is a side sectional illustration of a portion of another alternate embodiment flexible seal ring for the assembly of FIG. 2.

FIG. 10 is a side sectional illustration of a portion another alternate embodiment flexible seal ring 182. In contrast to the seal ring 58 of FIG. 4, the longitudinal chord 156 is substantially parallel with the upstream leg outer portion 162 and the longitudinal chord 160 is substantially parallel with the downstream leg outer portion 166.

Figure 11:
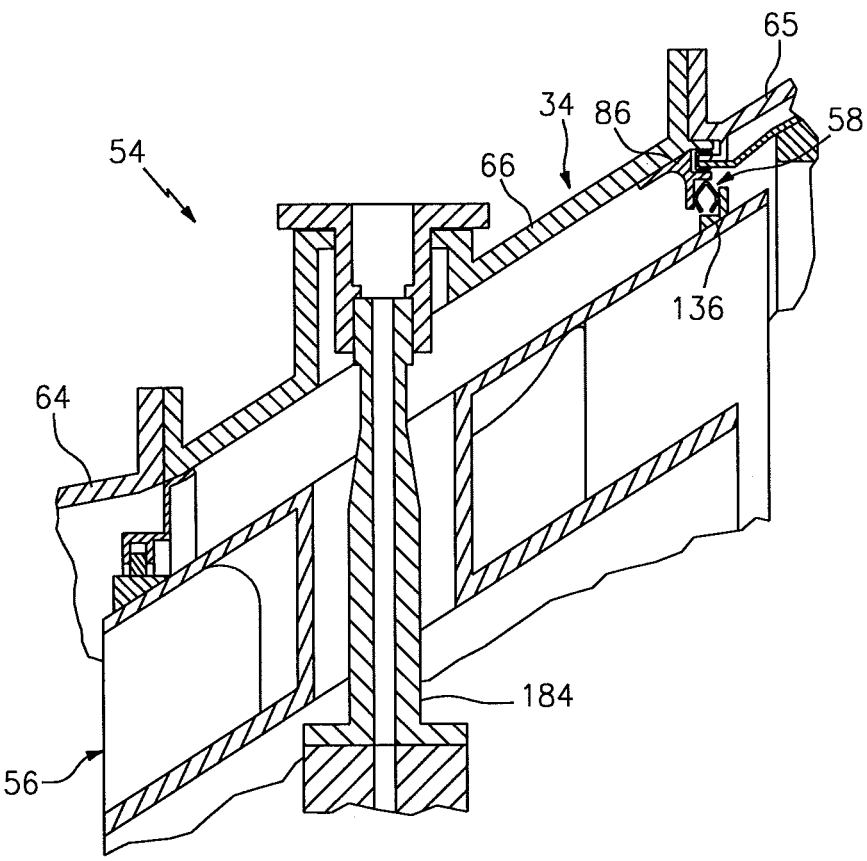
FIG. 11 is a side sectional illustration of a portion of the assembly of FIG. 2 configured with one or more struts.

FIG. 11 is a side sectional illustration of a portion of the assembly 54 configured with one or more struts 184. The struts 184 may be configured as tie rods that structurally connect the stators supporting the bearings 48 (see FIG. 1) to the intermediate case 66. In this manner, the assembly 54 may structurally supports one or more of the bearings 48 and, thus, one or more of the shafts 44 and 46.

One or more components of the assembly 54 may have various configurations other than those described above and illustrated in the drawings. The upstream seal land 86, for example, may be defined by a shoulder of the intermediate case 66, or alternatively any other turbine engine component. The downstream seal land 136 may be defined by a shoulder of the outer platform 110, or alternatively any other turbine engine component. Some or each of the turbine engine cases 64-66 may be configured as a unitary body. The seal ring 58, 176, 182 may be configured as a split ring, or with a substantially continuous full hoop body. The seal ring legs 148 and 150 may be connected together by one or more intermediate legs. The present invention therefore is not limited to any particular assembly component configurations.

The terms "upstream", "downstream", "inner" and "outer" are used to orientate the components of the assembly 54 described above relative to the turbine engine 20 and its axis 22. A person of skill in the art will recognize, however, one or more of these components may be utilized in other orientations than those described above. For example, the seal land 86 may be arranged downstream of the seal land 136. The present invention therefore is not limited to any particular assembly spatial orientations.

The assembly 54 may be included in various turbine engines other than the one described above. The assembly, for example, may be included in a geared turbine engine where a gear train connects one or more shafts to one or more rotors in a fan section, a compressor section and/or any other engine section. Alternatively, the assembly may be included in a turbine engine configured without a gear train. The assembly may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, comprising:
   a case extending circumferentially around an axis and axially along the axis between a forward end and an aft end, and the case including a first seal land;
   a guide vane arrangement located radially within the case, the guide vane arrangement including a first platform and a second seal land, the first platform extending axially along the axis between an upstream end and a downstream end, and the second seal land connected to the first platform at the downstream end; and
   a flexible seal ring at least partially sealing a gap between the first seal land and the second seal land, the seal ring including a first leg and a second leg that is connected to the first leg at a corner of the seal ring;
   wherein the first leg is axially engaged with a first surface of the first seal land, and the second leg is axially engaged with a second surface of the second seal land;
   wherein the case partially axially overlaps the guide vane arrangement such that the second surface is aft of the aft end of the case along the axis; and
   wherein the seal ring is configured with a generally v-shaped cross-sectional geometry.

2. The assembly of claim 1, wherein the first leg and the second leg extend radially inwards from the corner of the seal ring.

3. The assembly of claim 2, wherein the corner of the seal ring radially engages an inner surface of the case.

4. The assembly of claim 3, wherein the case includes an axially extending tab that defines the inner surface.

5. The assembly of claim 1, wherein a longitudinal chord of the first leg is angularly offset from a longitudinal chord of the second leg by between ten degrees and thirty degrees.

6. The assembly of claim 1, wherein
the first leg includes a first portion and a second portion;
the first portion extends radially from the corner of the seal ring to the second portion, and has a straight cross-sectional geometry; and
the second portion axially engages the first seal land, and has an arcuate cross-sectional geometry.

7. The assembly of claim 1, wherein
the second leg includes a first portion and a second portion;
the first portion extends radially from the corner of the seal ring to the second portion, and has a straight cross-sectional geometry; and
the second portion axially engages the second seal land, and has an arcuate cross-sectional geometry.

8. The assembly of claim 1, wherein the second seal land moves at least one of axially and radially relative to the first seal land.

9. The assembly of claim 1, wherein the seal ring slides radially against the second seal land.

10. The assembly of claim 1, wherein
the first surface is an annular first surface; and
the second surface is an annular second surface.

11. The assembly of claim 1, wherein the case further includes a tubular body, and the first seal land is located radially within and bonded to the tubular body.

12. The assembly of claim 1, wherein
the guide vane arrangement further includes an inner platform, an outer platform and a plurality of stator vanes extending radially between the inner platform and the outer platform;
the first platform comprises the outer platform; and
the second seal land circumscribes and is bonded to the outer platform.

13. The assembly of claim 1, further comprising:
a second case, wherein the case comprises a first case; and
a blade outer air seal located radially within and fastened to the second case;
wherein the first seal land includes a passage that directs air from a first plenum extending radially between the first case and the guide vane arrangement to a second plenum extending radially between the second case and the blade outer air seal.

14. The assembly of claim 1, wherein
the guide vane arrangement further comprises an inner platform, an outer platform and a plurality of stator vanes extending radially between the inner platform and the outer platform;
the first platform comprises the outer platform; and
the inner platform, the outer platform and the stator vanes are located radially within the case.

15. The assembly of claim 1, wherein the flexible seal ring comprises multiple plies of overlapped material.

16. An assembly for a turbine engine, comprising:
a case extending circumferentially around an axis and axially along the axis between a forward end and an aft end, and the case including an annular first surface;
a guide vane arrangement extending circumferentially around the axis, the guide vane arrangement comprising an annular second surface, a first platform and a plurality of stator vanes radially within the case, the first platform extending axially along the axis between an upstream end and a downstream end, and the annular second surface located at the downstream end; and
a flexible seal ring engaged axially between and at least partially sealing a gap between the annular first surface and the annular second surface, wherein the seal ring extends circumferentially around the axis and is configured with a generally v-shaped cross-sectional geometry, and wherein the annular second surface is located axially aft of the aft end of the case along the axis;
wherein the case axially overlaps the guide vane arrangement.

17. The assembly of claim 16, wherein
the seal ring includes a first leg and a second leg that is connected to the first leg at a corner;
the first leg is axially engaged with the annular first surface; and
the second leg is axially engaged with the annular second surface.

18. The assembly of claim 16, wherein
the case further includes a tubular body and a seal land that is located radially within and bonded to the tubular body; and
the seal land includes the annular first surface.

19. The assembly of claim 16, wherein
the first platform is an outer platform;
the guide vane arrangement further includes a seal land that circumscribes and is bonded to the outer platform; and
the seal land includes the annular second surface.

20. An assembly for a turbine engine, comprising:
a case extending circumferentially around an axis and axially along the axis between a forward end and an aft end, and the case including a first seal land;
a guide vane arrangement located radially within the case, and including a second seal land; and
a flexible seal ring at least partially sealing a gap between the first seal land and the second seal land, the seal ring including a corner, a first leg and a second leg that is connected to the first leg at the corner, the corner radially outboard of the first leg and the second leg, and the seal ring radially outboard of a platform of the guide vane arrangement;
wherein a longitudinal chord of the first leg is angularly offset from a longitudinal chord of the second leg by between ten degrees and thirty degrees;
wherein the first leg is axially engaged with a first surface of the first seal land, and the second leg is axially engaged with a second surface of the second seal land; and
wherein the guide vane arrangement is partially axially overlapped by the case such that the second surface is aft of the aft end of the case along the axis.

* * * * *